(12) United States Patent
Seyed et al.

(10) Patent No.: US 11,444,701 B2
(45) Date of Patent: *Sep. 13, 2022

(54) DETERMINING PROXIMITY OF TRANSMITTER ANTENNAS OF PORTABLE DEVICES TO A HUMAN BODY FOR LIMITING TRANSMITTER OUTPUT POWER TO MEET SPECIFIC ABSORPTION RATE (SAR) REQUIREMENTS

(71) Applicant: Magic Leap, Inc., Plantation, FL (US)

(72) Inventors: Shurhabeel Zamir Seyed, Coral Springs, FL (US); Koon Keong Shee, Miramar, FL (US); Aly Aly, Coral Springs, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,736

(22) Filed: Apr. 30, 2021

(65) Prior Publication Data

US 2021/0320729 A1 Oct. 14, 2021

Related U.S. Application Data

(60) Continuation of application No. 16/867,871, filed on May 6, 2020, now Pat. No. 11,032,013, which is a
(Continued)

(51) Int. Cl.
*H04B 7/00* (2006.01)
*H04B 17/10* (2015.01)
(Continued)

(52) U.S. Cl.
CPC ......... *H04B 17/102* (2015.01); *H04B 1/3833* (2013.01); *H04W 52/283* (2013.01); *H04W 52/367* (2013.01)

(58) Field of Classification Search
CPC .. H04B 5/0037; H04B 17/102; H04B 1/3833; H04B 5/0031; H04B 17/309; H04B 52/283; H04B 52/367
See application file for complete search history.

(56) References Cited

U.S. PATENT DOCUMENTS

| 9,871,387 B1* | 1/2018 | Bell ........................ H02J 50/80 |
| 9,871,545 B2* | 1/2018 | Khawand ............. H04B 1/3838 |

(Continued)

FOREIGN PATENT DOCUMENTS

| CN | 102835036 | 12/2012 |
| WO | WO 2016/089714 | 6/2016 |

OTHER PUBLICATIONS

PCT International Search Report and Written Opinion for International Appln. No. PCT/US17/66855, Applicant Magic Leap, Inc., forms PCT/ISA/210, 220, and 237, dated Mar. 14, 2018 (11 pages).

(Continued)

*Primary Examiner* — Nhan T Le
(74) *Attorney, Agent, or Firm* — Vista IP Law Group, LLP

(57) ABSTRACT

A method for adjusting transmitter output power ($P_{TX}$) comprises sensing, by a proximity sensor communicatively coupled to a transmitting device, whether an object is proximate to the transmitting device. The method further comprises analyzing an image from a camera to determine whether the transmitting device is proximate to a portion of a human body, when the proximity sensor senses the object proximate to the transmitting device. Further, the method comprises adjusting the $P_{TX}$ of an antenna operatively coupled to the transmitting device to be less than or equal to a SAR threshold output power ($P_{SARMAX}$), when it is determined that the transmitting device is proximate to the portion of the human body or when it cannot be determined
(Continued)

whether the transmitting device is proximate to a portion of a human body.

20 Claims, 7 Drawing Sheets

Related U.S. Application Data continuation of application No. 16/536,220, filed on Aug. 8, 2019, now Pat. No. 10,686,538, which is a division of application No. 15/844,392, filed on Dec. 15, 2017, now Pat. No. 10,425,171.

(60) Provisional application No. 62/435,383, filed on Dec. 16, 2016.

(51) Int. Cl.
*H04W 52/28* (2009.01)
*H04W 52/36* (2009.01)
*H04B 1/3827* (2015.01)

(56) References Cited

U.S. PATENT DOCUMENTS

| | | | |
|---|---|---|---|
| 10,425,171 B2* | 9/2019 | Seyed | H04B 1/3833 |
| 11,032,013 B2* | 6/2021 | Seyed | H04W 52/367 |
| 2011/0105175 A1* | 5/2011 | Wang | H04W 52/24 455/522 |
| 2011/0250928 A1 | 10/2011 | Schlub et al. | |
| 2012/0214422 A1 | 8/2012 | Shi et al. | |
| 2012/0270592 A1 | 10/2012 | Ngai et al. | |
| 2013/0070957 A1 | 3/2013 | Zhang et al. | |
| 2015/0141080 A1 | 5/2015 | Standing | |
| 2015/0201387 A1 | 7/2015 | Khawand et al. | |
| 2015/0370071 A1 | 12/2015 | Alton et al. | |
| 2016/0164563 A1 | 6/2016 | Khawand et al. | |
| 2016/0365886 A1 | 12/2016 | Prendergast et al. | |

OTHER PUBLICATIONS

Non-Final Office Action dated Jan. 22, 2019 for U.S. Appl. No. 15/844,392.
Extended European Search Report for EP Appln. No. 17880954.7 dated Nov. 20, 2019.
Non-Final Office Action dated Oct. 28, 2019 for U.S. Appl. No. 16/536,220.
Amendment/Response filed Jan. 28, 2020 for U.S. Appl. No. 16/536,220.
Notice of Allowance for U.S. Appl. No. 16/536,220 dated Feb. 7, 2020.
Non-Final Office Action for U.S. Appl. No. 16/867,871 dated Sep. 23, 2020.
Response to Non-Final Office Action for U.S. Appl. No. 16/867,871, filed Dec. 22, 2020.
Foreign Notice of Allowance for KR Patent Appln. No. 10-2019-7020374 dated Jan. 5, 2021.
Notice of Allowance for U.S. Appl. No. 16/867,871 dated Feb. 2, 2021.
Foreign Notice of Allowance for EP Patent Appln. No. 17880954.7 dated Nov. 23, 2020.
Foreign Notice of Allowance for JP Patent Appln. No. 2019-532029 dated Mar. 15, 2021.
Foreign NOA for IL Patent Appln. No. 267213 dated Jan. 19, 2021.
Foreign Exam Report for AU Patent Appln. No. 2017378496 dated Mar. 16, 2021.
Foreign OA for JP Patent Appln. No. 2021-66896 dated Jul. 14, 2021.
Extended European Search Report for EP Appln. No. 21165347.2 dated Jun. 23, 2021.
Foreign Response for JP Patent Appln. No. 2021-66896 dated Sep. 16, 2021.
Foreign NOA for IL Patent Appln. No. 282279 dated Sep. 29, 2021.
Foreign NOA for JP Patent Appln. No. 2021-66896 dated Dec. 13, 2021.
Foreign OA for IN Patent Appln. No. 201947024961 dated Dec. 15, 2021.
Foreign OA for CN Patent Appln. No. 201780077973.7 dated Oct. 11, 2021.
Foreign NOA for KR Patent Appln. No. 10-2021-7010035 dated Jan. 11, 2022.
Foreign Response for AU Patent Appln. No. 2017378496 dated Jan. 24, 2022.
Foreign Response for EP Patent Appln. No. 21165347.2 dated Feb. 4, 2022.
Foreign Response for CN Patent Appln. No. 201780077973.7 dated Feb. 28, 2022.
Foreign OA for CN Patent Appln. No. 201780077973.7 dated May 30, 2022 with English translation.

* cited by examiner

DETERMINING PROXIMITY OF TRANSMITTER ANTENNAS OF PORTABLE DEVICES TO A HUMAN BODY FOR LIMITING TRANSMITTER OUTPUT POWER TO MEET SPECIFIC ABSORPTION RATE (SAR) REQUIREMENTS

CROSS-REFERENCE TO RELATED APPLICATIONS

The present application is a continuation of U.S. patent application Ser. No. 16/867,871 filed on May 6, 2020 and entitled "Determining Proximity of Transmitter Antennas of Portable Devices to a Human Body for Limiting Transmitter Output Power to Meet Specific Absorption Rate (SAR) Requirements" which is a continuation of U.S. patent application Ser. No. 16/536,220, entitled, "Determining Proximity of Transmitter Antennas of Portable Devices to a Human Body for Limiting Transmitter Output Power to Meet Specific Absorption Rate (SAR) Requirements," filed on Aug. 8, 2019. U.S. patent application Ser. No. 16/536,220 is a divisional patent application of U.S. patent application Ser. No. 15/844,392, entitled, "Determining Proximity of Transmitter Antennas of Portable Devices to a Human Body for Limiting Transmitter Output Power to Meet Specific Absorption Rate (SAR) Requirements," filed Dec. 15, 2017, entitled, "Determining Proximity of Transmitter Antennas of Portable Devices to A Huma Body for Limiting Transmitter Output Power to Meet Specific Absorption Rate (SAR) Requirements," which claims the benefit of U.S. Prov. Pat. App. Ser. No. 62/435,383 filed on Dec. 16, 2016 and entitled "Determining Proximity of Transmitter Antennas of Portable Devices to A Human Body for Limiting Transmitter Output Power to Meet Specific Absorption Rate (SAR) Requirements." The contents of the aforementioned U.S. patent applications and U.S. provisional patent application are hereby expressly and fully incorporated by reference in their entireties, as though set forth in full.

FIELD

The present disclosure relates to determining proximity of transmitter antennas of portable devices to a human body. In particular, it relates to determining proximity of transmitter antennas of portable devices to a human body for limiting transmitter output power ($P_{TX}$) to meet specific absorption rate (SAR) requirements.

BACKGROUND

Portable devices used by the general public need to meet regulatory specific absorption rate (SAR) compliance requirements (e.g., refer to Federal Communications Commission (FCC) Part 15—Radio Frequency (RF) exposure requirements). The need to limit a user's exposure to RF energy from a portable device (in particular, from the device's RF transmitter antenna) under the regulatory thresholds may necessitate a need in certain use cases to limit the transmitter power at a level ($P_{SARMAX}$), which is below the maximum transmitter power ($P_{MAX}$). In such cases, during which a portable device may be closer to human body than in other use case scenarios, the RF exposure to the user from the device may exceed mandatory SAR exposure limits if the transmitter of the device is allowed to operate at its maximum transmitter power.

On the other hand, unnecessarily cutting back the transmitter power of the device in situations where the device is not close to human body, or the device is being operated in a way that does not cause SAR exposure above compliance limits, would result in reduced wireless link performance and network range (e.g., in cellular networks, wireless local area network (WLAN) networks, etc.). As such, there is a need for an improved design for determining the relationship of RF devices to proximate humans to determine maximum permissible transmitter power within SAR requirements.

SUMMARY

The present disclosure relates to a method, system, and apparatus for adjusting transmitter output power ($P_{TX}$) according to the proximity of the portable device to a human body to meet SAR requirements. In one or more embodiments, a method for adjusting $P_{TX}$ comprises sensing, by a proximity sensor communicatively coupled to a transmitting device, whether an object is proximate to the transmitting device. The method further comprises analyzing an image from a camera to determine whether the transmitting device is proximate to a portion of a human body, when the proximity sensor senses the object proximate to the transmitting device. Further, the method comprises adjusting the $P_{TX}$ of an antenna operatively coupled to the transmitting device to be less than or equal to a SAR threshold output power ($P_{SARMAX}$), when it is determined that the transmitting device is proximate to the portion of the human body or when it cannot be determined whether the transmitting device is proximate to a portion of a human body.

In one or more embodiments, the method further comprises sensing, by a proximity sensor communicatively coupled to a transmitting device, an object proximate to the transmitting device. The method also comprises determining whether the $P_{TX}$ of an antenna operatively coupled to the transmitting device is greater than a SAR threshold output power ($P_{SARMAX}$), when the proximity sensor senses the object proximate to the transmitting device. In addition, the method comprises obtaining an image from a camera. Additionally, the method comprises analyzing the image to determine whether the transmitting device is proximate to a portion of a human body, when it is determined that the $P_{TX}$ of the antenna is greater than the $P_{SARMAX}$. Further, the method comprises adjusting the $P_{TX}$ of the antenna to be less than or equal to $P_{SARMAX}$, when it is determined that the transmitting device is proximate to the portion of the human body or when it cannot be determined whether the transmitting device is proximate to a portion of a human body.

In at least one embodiment, the method further comprises determining whether the antenna is transmitting.

In at least one embodiment, the method further comprises not adjusting the $P_{TX}$ of the antenna, when the proximity sensor does not sense the object proximate to the transmitting device.

In one or more embodiments, the method further comprises determining whether a human body proximity flag has been set, when it is determined that the $P_{TX}$ of the antenna is not greater than the $P_{SARMAX}$.

In at least one embodiment, the method further comprises delaying performance of the method by a predetermined amount of time, when it is determined that the human body proximity flag has been set.

In one or more embodiments, the method further comprises not adjusting the $P_{TX}$ of the antenna, when it is determined that the human body proximity flag has not been set.

In at least one embodiment, the method further comprises clearing a human body proximity flag, after the obtaining of the image.

In at least one embodiment, the method further comprises determining whether the transmitting device is within a field of view (FOV) of the camera by analyzing the image.

In one or more embodiments, the method further comprises adjusting the $P_{TX}$ of the antenna to be less than or equal to $P_{SARMAX}$, when it is determined that the transmitting device is not within the FOV of the camera.

In at least one embodiment, the method further comprises not adjusting the $P_{TX}$ of the antenna, when it is determined that the transmitting device is not proximate to the portion of the human body.

In one or more embodiments, the method further comprises setting a human body proximity flag, when it is determined that the transmitting device is proximate to the portion of the human body or when it cannot be determined whether the transmitting device is proximate to a portion of a human body.

In at least one embodiment, the proximity sensor is an optical sensor, a capacitive touch sensor, or a mechanical button sensor.

In one or more embodiments, the antenna is internal or external to the transmitting device.

In at least one embodiment, the antenna is transmitting a radio frequency (RF) signal.

In one or more embodiments, the camera is operatively coupled to a user device.

In at least one embodiment, the user device is a head-mounted display.

In one or more embodiments, a system for adjusting transmitter output power ($P_{TX}$) comprises a transmitting device. The system further comprises an antenna operatively coupled to the transmitting device. The system also comprises a proximity sensor, communicatively coupled to the transmitting device, to sense an object proximate to the transmitting device. In addition, the system comprises a camera to obtain an image. Further, the system comprises a processor: (1) to determine whether the $P_{TX}$ of the antenna is greater than a SAR threshold output power ($P_{SARMAX}$) when the proximity sensor senses the object proximate to the transmitting device, (2) to analyze the image to determine whether the transmitting device is proximate to a portion of a human body when it is determined that the $P_{TX}$ of the antenna is greater than the $P_{SARMAX}$, and (3) to adjust the $P_{TX}$ of the antenna to be less than or equal to $P_{SARMAX}$ when it is determined that the transmitting device is proximate to the portion of the human body or when it cannot be determined whether the transmitting device is proximate to a portion of a human body.

In at least one embodiment, the processor determines whether the antenna is transmitting.

In at least one embodiment, the processor does not adjust the $P_{TX}$ of the antenna, when the proximity sensor does not sense the object proximate to the transmitting device.

In one or more embodiments, the processor determines whether a human body proximity flag has been set, when the processor determines that the $P_{TX}$ of the antenna is not greater than the $P_{SARMAX}$.

In at least one embodiment, performance of the processor is delayed by a predetermined amount of time, when the processor determines that the human body proximity flag has been set.

In one or more embodiments, the processor does not adjust the $P_{TX}$ of the antenna, when the processor determines that the human body proximity flag has not been set.

In at least one embodiment, the processor clears a human body proximity flag, after the camera obtains the image.

In one or more embodiments, the processor determines whether the transmitting device is within a FOV of the camera by analyzing the image.

In at least one embodiment, the processor adjusts the $P_{TX}$ of the antenna to be less than or equal to $P_{SARMAX}$, when the processor determines that the transmitting device is not within the FOV of the camera.

In one or more embodiments, the processor does not adjust the $P_{TX}$ of the antenna, when the processor determines that the transmitting device is not proximate to the portion of the human body.

In at least one embodiment, the processor sets a human body proximity flag, when the processor determines that the transmitting device is proximate to the portion of the human body or when it cannot be determined whether the transmitting device is proximate to a portion of a human body. In one or more embodiments, the proximity sensor is an optical sensor, a capacitive touch sensor, or a mechanical button sensor.

In one or more embodiments, a method for adjusting a maximum level of RF transmission power comprises obtaining output data from at least one sensor configured to monitor one or more conditions of at least one radio frequency (RF) antenna of a computing device relative to an environment of the computing device, determining that output data obtained from the at least one sensor indicates that the computing device is positioned relative to one or more objects located in the environment of the computing device in a manner such that, under current operating parameters of the at least one RF antenna, the one or more objects are subject to being exposed to levels of RF energy that exceed one or more thresholds, in response to determining that output data obtained from the at least one sensor indicates that, under current operating parameters of the at least one RF antenna, the one or more objects are subject to being exposed to levels of RF energy that exceed one or more thresholds, obtaining one or more images from at least one camera, processing the one or more images, determining, based on processing the one or more images obtained from the at least one camera, that the one or more images do not serve to confirm that none of the one or more objects are biologically human, and in response to determining that the one or more images do not serve to confirm that none of the one or more objects are biologically human, adjusting a maximum level of power at which the at least one antenna is to transmit RF signals.

In some embodiments, processing the one or more images processing the one or more images obtained from the at least one camera comprises performing one or more image recognition processes to identify specific objects shown in the one or more images.

In some of such embodiments, determining that the one or more images do not serve to confirm that none of the one or more objects are biologically human comprises determining, based on processing the one or more images obtained from the at least one camera, that the computing device is not identified as being shown in the one or more images.

In some of such embodiments, determining that the one or more images do not serve to confirm that none of the one or more objects are biologically human comprises determining, based on processing the one or more images obtained from the at least one camera, that at least one of the one or more objects is identified as being a human body or portion thereof.

In some of such embodiments, determining that the one or more images do not serve to confirm that none of the one or more objects are biologically human comprises determining, based on processing the one or more images obtained from the at least one camera, that at least one of the one or more objects is unidentifiable or is not identified as being shown in the one or more images.

In some embodiments, the at least one sensor is a proximity sensor configured to monitor a distance between the at least one antenna and physical objects located in the environment of the computing device. In some of these embodiments, determining that output data obtained from the at least one sensor indicates that the computing device is positioned relative to one or more objects located in the environment of the computing device in a manner such that, under current operating parameters of the at least one RF antenna, the one or more objects are subject to being exposed to levels of RF energy that exceed one or more thresholds comprises evaluating the output data obtained from the at least one sensor against a look-up table, and determining, based on the evaluation results, that the computing device is positioned close enough to the one or more objects such that, under current operating parameters of the at least one RF antenna, the one or more objects are subject to being exposed to levels of RF energy that exceed one or more thresholds.

In some embodiments, the at least one sensor further is an orientation sensor configured to monitor an orientation of the computing device relative to the environment of the computing device.

In one or more embodiments, a computing system comprises a physical housing structure and a plurality of electronic hardware components, at least a portion of which are contained within or attached to the physical housing structure. The plurality of electronic hardware components may include at least one antenna for transmitting radio frequency (RF) signals, at least one sensor configured to monitor one or more conditions of the at least one antenna relative to an environment of the physical housing structure, at least one camera, and at least one processor communicatively coupled to the at least one antenna, the at least one sensor, and the at least one camera. The at least one processor may be configured to obtain output data from the at least one sensor, determine whether output data obtained from the at least one sensor indicates that the physical housing structure is positioned relative to one or more objects located in the environment of the physical housing structure in a manner such that, under current operating parameters of the at least one antenna, the one or more objects are subject to being exposed to levels of RF energy that exceed one or more thresholds, obtain one or more images from the at least one camera in response to determining that output data obtained from the at least one sensor indicates that, under current operating parameters of the at least one antenna, the one or more objects are subject to being exposed to levels of RF energy that exceed one or more thresholds, process the one or more images obtained from the at least one camera to determine whether the one or more images serve to confirm that none of the one or more objects are biologically human, determine a maximum level of power at which the at least one antenna is to transmit RF signals based on determining whether the one or more images serve to confirm that none of the one or more objects are biologically human, and control the at least one antenna to transmit RF signals at levels of power less than or equal to the determined maximum level of power.

In at least one embodiment, the at least one processor does not belong to the portion of the plurality of electronic hardware components that are contained within or attached to the physical housing structure.

In some embodiments, the at least one camera does not belong to the portion of the plurality of electronic hardware components that are contained within or attached to the physical housing structure.

In some of these embodiments, the at least one camera is contained within or attached to a user device that is physically displaced from the physical housing structure. In at least one of these embodiments, the user device is a headset. In another of these embodiments, the user device is a handheld controller.

In some of these embodiments, the at least one sensor configured to monitor one or more conditions of the at least one antenna relative to the environment of the physical housing structure belongs to the portion of the plurality of electronic hardware components that are contained within or attached to the physical housing structure.

In some embodiments, the plurality of electronic hardware components further comprise at least one user interface component communicatively coupled to the at least one processor. In at least one of these embodiments, the at least one processor is further configured to provide one or more alerts for output through the at least one user interface component in response to determining that the one or more images do not serve to confirm that none of the one or more objects are biologically human.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1A:
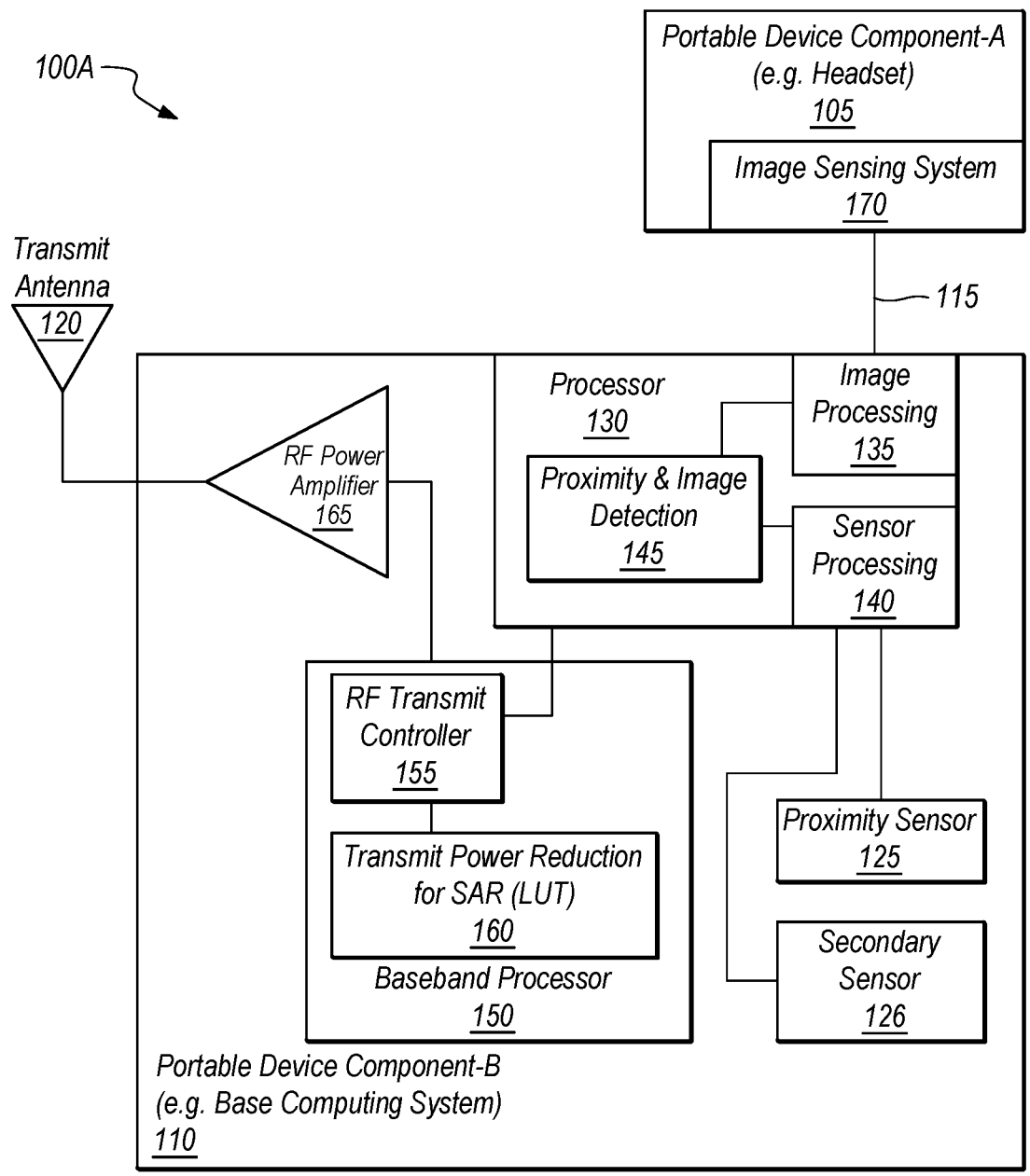
FIG. 1A is a block diagram showing the disclosed system for determining the proximity of transmitter antennas of portable devices to a human body for limiting transmitter output power ($P_{TX}$) to meet specific absorption rate (SAR) requirements, in accordance with at least one embodiment of the present disclosure.

The methods and apparatus disclosed herein provide an operative system for adjusting transmitter output power ($P_{TX}$) according to the proximity of the portable device (e.g., a transmitting device) to a human body to maximize transmission potential relative to specific absorption rate (SAR) requirements as described above. The system of the present disclosure provides a method that uses real-time image sensing and image recognition capability of a wireless portable device along with proximity sensing to accurately detect the physical proximity of a radio frequency (RF) transmitter antenna of the portable device to a human body. In order to keep SAR exposure to the user below regulatory limits during normal operation of a wireless device, the RF transmitter output power level may need to be limited below its maximum power for the cases where the transmitter antenna comes in close proximity to human body. The use of image recognition to compliment proximity sensing provides a powerful method to distinguish whether the RF transmitter antenna is near a human body or merely near some other random object. If the system determines that the RF transmitter antenna is in proximity to a human body, then the RF transmitter power can be limited to a level below its maximum power level in order to meet regulatory limits for SAR exposure.

As previously mentioned above, portable devices used by the general public need to meet regulatory SAR compliance requirements (e.g., refer to Federal Communications Commission (FCC) Part 15—RF exposure requirements). The need to limit a user's exposure to RF energy from a portable device (in particular, from the device's RF transmitter antenna) under the regulatory thresholds may necessitate a need in certain use cases to limit the transmitter power at a level ($P_{SARMAX}$), which is below the maximum transmitter power ($P_{MAX}$). In such cases, during which a portable device may be closer to human body than in other use case scenarios, the RF exposure to the user from the device may exceed mandatory SAR exposure limits if the transmitter of the device is allowed to operate at its maximum transmitter power. On the other hand, unnecessarily cutting back the transmitter power of the device in situations where the device is not close to human body, or the device is being operated in a way that does not cause SAR exposure above compliance limits, would result in reduced wireless link performance and network range (e.g., in cellular networks, wireless local area network (WLAN) networks, etc.).

Currently, some conventional methods use proximity sensors along with some other subjective indicators to determine whether to limit the transmitter power of a portable device (e.g., a transmitting device) below its maximum power for reducing SAR exposure. However, these methods do not use real-time image sensing and image/pattern recognition to complement proximity sensing in order to accurately determine proximity of the RF transmitter antenna of the device to a human body. These methods could be overly conservative in that they tend to limit the transmitter power even in situations where the device could be in proximity of non-human objects. This is because these methods cannot accurately distinguish the type of object in proximity with the device. As such, these methods may unnecessarily limit the wireless network range and degrade link performance in situations where it is avoidable.

As such, there is a need to limit the RF transmitter power to a level $P_{SARMAX}$, which is less than (<) PMAX, in use cases during which proximity of the RF antenna to a human body results in SAR exposure exceeding regulatory limits if the transmitter operates above $P_{SARMAX}$. Additionally, there is a need to not limit the RF transmitter power below the maximum power ($P_{MAX}$) in use cases during which SAR exposure does not exceed regulatory limits while operating at the maximum power $P_{MAX}$.

It should be noted that during product development, SAR is normally characterized for all use cases, and maximum power levels ($P_{SARMAX}$) are determined at which the transmitter could safely operate without exceeding the SAR limits. The challenge is then to detect in real-time if the device is being operated in a use case which requires limiting the transmitter power to $P_{SARMAX}<P_{MAX}$ in order to meet SAR exposure requirements, while at the same time to not limit the transmitter power below $P_{MAX}$ when the device is being operated in a way that does not require limiting transmitter power to meet SAR exposure requirements.

The present disclosure provides a system that comprises: (a) one or more image sensors, and (b) one or more RF transmitter antennas and proximity sensors. Within the system, image sensors and portable device RF transmitter antennas are arranged in a manner such that the image sensors are able to detect the portable device RF transmitter antennas in their field of view (e.g., this can be achieved by not physically collocating the image sensors and the portable device RF transmitter antennas. Furthermore, one or more RF transmitter antennas and at least one proximity sensor (e.g., an optical sensor, a capacitive touch sensor, a mechanical button, etc.), which is capable of detecting proximity of an object to the portable device, are mounted physically close to each other.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to portable devices, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1A is a block diagram 100A showing the disclosed system for determining the proximity of transmitter antennas of portable devices to a human body for limiting transmitter output power ($P_{TX}$) to meet specific absorption rate (SAR) requirements, in accordance with at least one embodiment of the present disclosure. In this figure, two separate portable device components are shown, which are portable device component A (e.g., a user device in the form of a headset worn by a user) 105 and portable device component B (e.g., a transmitting device) 110. It should be noted that portable device component A 105 and portable device component B 110 are communicatively coupled 115 to one another via wirelessly and/or wire.

Portable device component A (e.g., user device) 105 may be a head-mounted display. In addition, portable device component A 105 is shown to include an image sensing system 170. The image sensing system may comprise one or more image sensors (e.g., a camera(s) to capture an image (s)). The one or more image sensors can include regular cameras, as well as thermographic imaging sensors such as forward looking infrared (FLIR) cameras and other infrared cameras. The image sensor(s) (e.g., camera(s)) are operatively coupled to portable device component A 105.

Portable device component B (e.g., a transmitting device) 110 is shown to include a transmit antenna 120. The transmit antenna 120 may be an RF antenna that transmits a radio frequency (RF) signal(s). In other embodiments, Portable device component B 110 may include more than one transmit antenna 120 as is shown in FIG. 1A. In addition, in various embodiments, the transmit antenna(s) 120 may be internal and/or external to portable device component B 110.

Portable device component B (e.g., a transmitting device) 110 may, for example, leverage the transmit antenna 120 to communicate with a variety of computing devices over one or more wireless networks. For instance, portable device component B (e.g., a transmitting device) 110 may use the transmit antenna 120 and other wireless communication componentry to communicate (directly or indirectly) with one or more servers as a client thereof, communicate (directly or indirectly) with one or more cloud computing devices, access one or more web resources, and the like. The portable device component B (e.g., a transmitting device) 110 may establish wireless communication with such computing devices according to any of a variety of wireless communications protocols, such as BLUETOOTH®, WI-FI® or some IEEE 802.11 compliant protocol (e.g., IEEE 802.11n, IEEE 802.11a/c, WiGig IEEE 802.11ad, High-Efficiency Wireless (HEW) 802.11ax, etc.), Long Term Evolution (LTE) or LTE Advanced, and the like.

Portable device component B (e.g., a transmitting device) 110 is shown to also include a proximity sensor 125. In other embodiments, Portable device component B 110 may include more than one proximity sensor 125, such as an optional secondary sensor 126 as is shown in FIG. 1A. It should be noted that various different types of sensors may be employed for the proximity sensor 125 and the secondary sensor 126 including, but not limited to optical sensors (e.g., infrared sensors, photoelectric sensors, etc.), capacitive touch sensors, inductive sensors, ultrasonic sensors, radar sensors, and/or mechanical button sensors. The proximity sensor 125, and in some embodiments the secondary sensor 126, are strategically located on and/or within the portable device component B (e.g., a transmitting device) 110 such that the proximity sensor 125 and the secondary sensor 126 are co-located with the transmit antenna(s) 120.

In addition, portable device component B (e.g., a transmitting device) 110 is also shown to include a processor 130. It should be noted that in some embodiments, the processor 130 is located in a device other than portable device component B (e.g., a transmitting device) 110, such as portable device component A (e.g., user device) 105 or another alternative device. In embodiments where the processor 130 is located in a device other than portable device component B (e.g., a transmitting device) 110, the device the processor 130 is located within will send a signal(s) to portable device component B (e.g., a transmitting device) 110 regarding any needed adjustment of the transmitter output power ($P_{TX}$).

In FIG. 1A, the processor 130 is shown to include an image processing unit 135 and a sensor processing unit 140, which are used for proximity and image detection. The sensor processing unit 140 is communicatively coupled to the proximity sensor 125 and the secondary sensor 126, and as such, is configured to receive sensor data. The sensor processing unit 140 analyzes sensor data received from the proximity sensor 125 and the secondary sensor 126 to determine whether an object is proximate to the portable device component B 110. In some examples, the sensor processing unit 140 is configured to generate an interrupt in response to determining that the portable device component B 110 is positioned less than a threshold distance away from one or more objects. Image processing unit 135 analyzes an image(s) from the image sensing system 170 to recognize or otherwise identify one or more objects in the image(s) positioned less than a threshold distance away from the portable device component B 110. In some examples, the image processing unit 135 may perform such operations in real-time. The image processing unit 135 utilizes image recognition software, which is programmed and/or trained to recognize or otherwise identify objects resembling a physical housing structure of the portable device component B 110 or a portion thereof. By locating the portable device component B 110 in the image(s), the image processing unit 135 can analyze other portions of the image(s) for one or more objects abutting and/or positioned within the immediate vicinity of the proximity sensor 125. More specifically, the image processing unit 135 analyzes the image(s) to determine whether the one or more objects proximate to the portable device component B 110 are recognized or otherwise identified as being non-human. As such, the image processing unit 135 may leverage one or more image processing techniques for recognizing a variety of everyday objects (e.g., architectural features of properties, household items, furniture, electronic devices, plants, creatures, vehicles, landmarks, etc.), as well as objects resembling the human body or an anatomical portion thereof. For embodiments in which one or more infrared cameras (e.g., forward looking infrared (FLIR) cameras) or other thermal imaging sensors are employed, the image processing unit 135 may leverage one or more image processing techniques for recognizing heat signatures of the human body, as well as the heat signatures of creatures and inanimate objects.

In some embodiments, one or more machine learning techniques may be leveraged so as to enable the image processing unit 135 to recognize image patterns that correlate with various scenarios, including scenarios in which at least a portion of the portable device component B 110 is positioned proximate to non-human objects and scenarios in which at least a portion of the portable device component B 110 is positioned proximate to human objects, with enhanced accuracy. For example, the image processing unit 135 may maintain or otherwise have access to one or more probabilistic statistical models (e.g., logistic regression models, Hidden Markov models, decision trees, artificial neural networks, Bayesian networks, combinations thereof, etc.) having been pre-trained using some prior images that show the portable device component B 110 or similar device positioned proximate to both non-human and human objects. Once pre-trained, the one or more probabilistic statistical models may be further updated based on data obtained at runtime, so as to enable the image processing unit 135 to "tweak" or otherwise fine-tune its image recognition capabilities based on the usage and/or environment of the system.

Additionally, portable device component B (e.g., a transmitting device) 110 is shown to include a baseband processor 150. The baseband processor 150 includes an RF transmit controller 155 and a transmit power reduction for SAR look-up table (LUT) 160. The RF transmit controller 155 and the transmit power reduction for SAR LUT 160 are used for adjusting the transmitter output power. More specifically, SAR LUT 160 may be informative as to the SAR threshold output power ($P_{SARMAX}$) value associated with different human-to-antenna distances (e.g., as may be measured by proximity sensor 125 and/or secondary sensor 126), device orientations (e.g., as may also be measured by proximity sensor 125 and/or secondary sensor 126), use cases (e.g., scenarios in which the portable device component B 110 is pressed against different portions of a user's body, scenarios in which the portable device component B 110 is resting on a table or other surface displaced from a user, etc.), and various permutations thereof. More specifically, the SAR LUT 160 may reflect the SAR threshold output power ($P_{SARMAX}$) values associated with each of a variety of different scenarios in which the portable device component B (e.g., a transmitting device) 110 is hypothetically capable of being out of compliance with SAR if the transmit antenna 120 was to transmit RF signals at maximum transmitter power ($P_{MAX}$) (i.e., the maximum RF transmission power that the portable device component B 110 is physically capable of achieving). The SAR LUT 160 may reflect the results of product testing and/or one or more models developed based on the specific characteristics of the portable device component B (e.g., a transmitting device) 110 and/or the portable device component A (e.g., a user device) 105. In some examples, the SAR LUT 160 may be dynamically adjusted over time to incorporate measurements and other data obtained by the portable device component B 110 throughout the course of operation.

The SAR threshold output power ($P_{SARMAX}$) values reflected in the SAR LUT 160 may serve as criteria against which the transmitter output power ($P_{TX}$) (i.e., the RF transmission power at any given time) and/or maximum transmitter power ($P_{MAX}$) (i.e., the maximum RF transmission power that the portable device component B 110 is capable of achieving) may be evaluated, and may also reflect the maximum SAR-compliant levels of power at which the transmit antenna 120 may transmit RF signals. As such, by evaluating sensor data (e.g., data output by the proximity sensor 125 and/or the secondary sensor 126) against the SAR LUT 160 (or some other model that effectively maps different scenarios (e.g., involving the transmit antenna 120 and one or more objects external to the portable device component B 110) to SAR threshold output power ($P_{SARMAX}$) values), the portable device component B 110 may be able to detect occurrences of events in which it is hypothetically capable of being SAR non-compliant. By also evaluating the current transmitter output power ($P_{TX}$) (i.e., the RF transmission power at any given time) against an SAR threshold output power ($P_{SARMAX}$) value associated with such a detected event, the portable device component B 110 may further determine whether further action may need to be taken. The portable device component B (e.g., a transmitting device) 110 is also shown to include an RF power amplifier 160. The baseband processor 150 sends a signal(s) to the RF power amplifier 160 to adjust the amount of amplification of the transmitted signal and, thereby, adjusts the transmitter output power.

During operation of the disclosed system, the baseband processor 150 first determines whether the transmit antenna 120 is active (i.e., whether the transmit antenna 120 transmitting a signal(s)). If the baseband processor 150 determines that the transmit antenna 120 is not active, then the baseband processor 150 will not adjust the transmitter output power ($P_{TX}$) (i.e., the transmitter output power is not limited).

However, if the baseband processor 150 determines that the transmit antenna 120 is active, then the proximity sensor 125, and in some embodiments the secondary sensor 126, sense whether an object (not shown) is proximate to the portable device component B (e.g., a transmitting device) 110. Specifically, the proximity sensor 125 and the secondary sensor 126 sense whether an object (not shown) is proximate to the transmit antenna(s) 120. Proximity may be defined to range from a few centimeters, to a few millimeters, or to actual touching of the portable device component B (e.g., a transmitting device) 110 to the object. In some embodiments, the proximity sensor 125 and/or the secondary sensor 126 serve to measure the distance between the transmit antenna(s) 120 and such an object. Furthermore, in some examples, the proximity sensor 125 and/or the secondary sensor 126 may serve to monitor the orientation of the portable device component B 110. Such distance measurements and orientation data may, for example, be informative as to a specific use case of the portable device component B 110. As mentioned above with reference to the SAR LUT 160, distance, orientation, and/or use case data can be indicative of the SAR threshold output power ($P_{SARMAX}$) value applicable to the portable device component B 110 at a given point in time.

If the sensor processing unit 140 determines that an object is not proximate to the portable device component B (e.g., a transmitting device) 110, then the baseband processor 150 will not adjust the $P_{TX}$ (i.e., the transmitter output power is not limited).

However, if the sensor processing unit 140 determines that an object is proximate to the portable device component B (e.g., a transmitting device) 110, then the baseband processor 150 determines whether the $P_{TX}$ is greater than a SAR threshold output power ($P_{SARMAX}$) As mentioned above, the SAR threshold output power ($P_{SARMAX}$) value to which $P_{TX}$ is compared may effectively be a function of device-to-human distance, device orientation, and/or use case. As such, the SAR threshold output power ($P_{SARMAX}$) value to which $P_{TX}$ is compared may be selected from the SAR LUT 160 or otherwise determined using data indicated in the SAR LUT 160 when the sensor processing unit 140 determines that an object is proximate to the portable device component B (e.g., a transmitting device) 110. It follows that data obtained from the proximity sensor 125 and/or the secondary sensor 126 may be leveraged in the identification of the SAR threshold output power ($P_{SARMAX}$) value in the SAR LUT 160 or other process for determining the SAR threshold output power ($P_{SARMAX}$) value that is currently applicable.

If the baseband processor 150 determines that the $P_{TX}$ is not greater than $P_{SARMAX}$, then the processor 130 determines whether a human body proximity flag has been set. If the processor 130 determines that a human body proximity flag has not been set, then the baseband processor 150 will not adjust the $P_{TX}$ (i.e., the transmitter output power is not limited).

However, if the baseband processor 150 determines that the $P_{TX}$ is greater than $P_{SARMAX}$, then performance of the operation of the system is delayed by a predetermined amount of time (e.g., a predetermined number of seconds). Then, the processor 130 obtains an image from the image sensing system (e.g., a camera(s)) 170. After obtaining the image, the processor 130 clears the human proximity flag. Then, the image processing unit 135 analyzes the image to determine whether the portable device component B (e.g., a transmitting device) 110 is within a field of view (FOV) of the image sensing system 170. If the image processing unit 135 determines that the portable device component B (e.g., a transmitting device) 110 is not within a FOV of the image sensing system 170, then the baseband processor 150 adjusts the $P_{TX}$ to be less than or equal to $P_{SARMAX}$.

However, if the image processing unit 135 determines that the portable device component B (e.g., a transmitting device) 110 is within a FOV of the image sensing system 170, then the image processing unit 135 analyzes the image to determine whether it can be confirmed that the portable device component B (e.g., a transmitting device) 110 is not proximate to a human body (e.g., as a result of the proximity sensor 125 having detected something other than a human proximate to the transmit antenna(s) 120). For example, the image processing unit 135 may effectively confirm that the portable device component B (e.g., a transmitting device) 110 is not located proximate to a human body by identifying a non-human object in the image(s) (e.g., through application of one or more image recognition techniques) as being proximate the portable device component B 110 in a position most readily detectable by the proximity sensor 125, identifying a human body at least partially shown in the image(s) as being positioned in a location not readily detectable by the proximity sensor 125, and/or identifying a human body at least partially shown in the image(s) as being positioned an adequate distance from the portable device component B 110. If the image processing unit 135 determines that the portable device component B (e.g., a transmitting device) 110 is indeed not proximate to a human body, then the baseband processor 150 will not adjust the $P_{TX}$ (i.e., the transmitter output power is not limited).

However, if the image processing unit 135 is unable to confirm that the portable device component B (e.g., a transmitting device) 110 is not proximate to a human body and/or if the image processing unit 135 determines that the portable device component B is proximate to a human body, then the baseband processor 150 adjusts the $P_{TX}$ to be less than or equal to $P_{SARMAX}$. Reducing $P_{TX}$ in the case where the image processing unit 135 is unable to confirm that the portable device component B (e.g., a transmitting device) 110 is not proximate to a human body minimizes the possibility of exposing proximate human bodies to RF energy. Then, the operation of the disclosed system simply repeats.

Figure 1B:
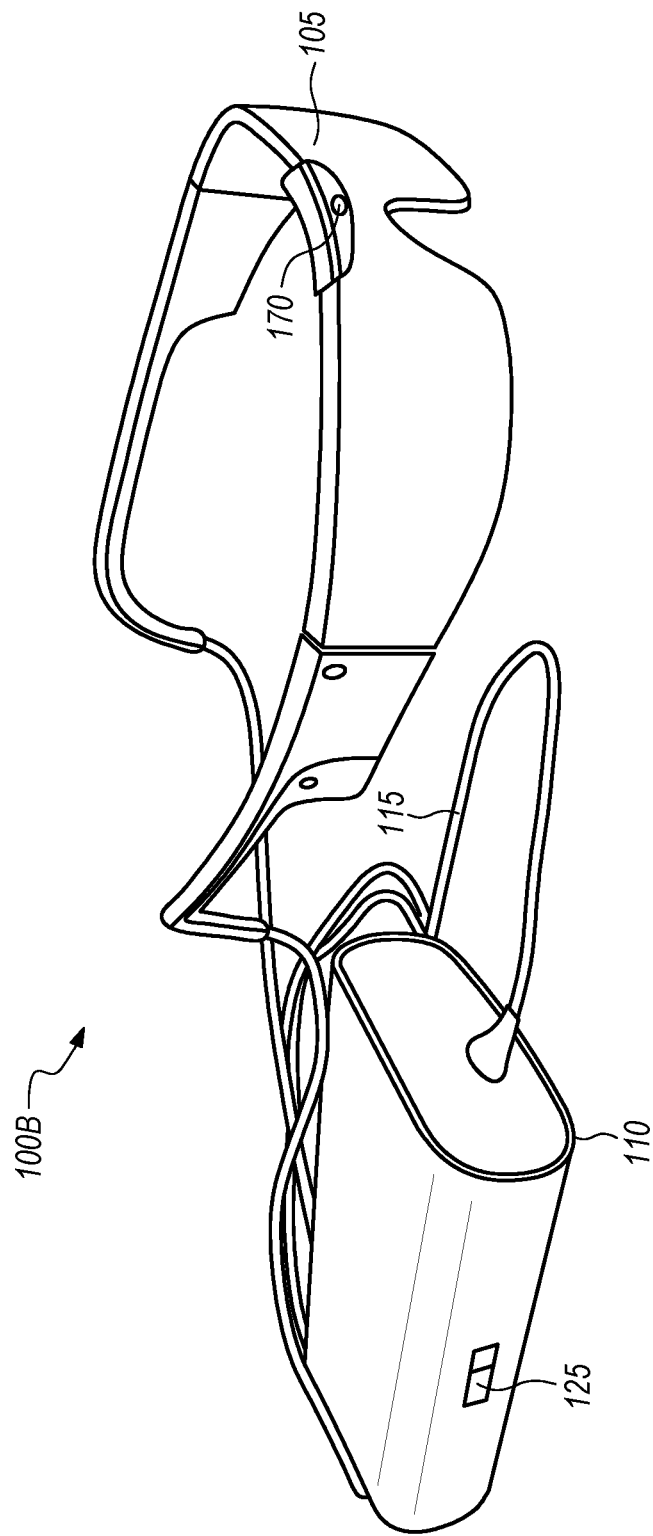
FIG. 1B is a diagram showing an augmented reality system including the disclosed system for determining the proximity of transmitter antennas of portable devices to a human body for limiting transmitter output power ($P_{TX}$) to meet specific absorption rate (SAR) requirements, in accordance with at least one embodiment of the present disclosure.

In some embodiments, the disclosed system may function as at least part of an augmented reality system. FIG. 1B shows an augmented reality system 100B that is operable to render virtual content (e.g., virtual objects, virtual tools, and other virtual constructs, for instance applications, features, characters, text, digits, and other symbols) in a field of view of a user. The augmented reality system 100B also includes portable device components 105 and 110, which in this example take the form of a user device and a transmitting device, respectively. More specifically, the user device 105 (i.e., headset) of the augmented reality system 100B may include optical components (e.g., a frame structure coupled to display system positioned in front of the eyes of the user) that deliver virtual content to the eyes of the user, and the transmitting device 110 of the augmented reality system 100B may include other essential components (e.g., processing components, power components, memory, etc.) that perform a multitude of processing tasks to present the relevant virtual content to the user.

The user device 105 may include user interface components, such as displays for displaying virtual reality content to a user. The user interface components may also include LED indicators, audio sources, haptic feedback devices such as vibration devices, and the like. As mentioned above with reference to FIG. 1A, the user device 105 may also include an image sensing system 170 comprising one or more image sensors. Such image sensors can include regular cameras, as well as thermographic imaging sensors such as forward looking infrared (FLIR) cameras and other infrared cameras. In some embodiments, the user device 105 may further include one or more microphones, inertial measurement units, accelerometers, compasses, GPS units, radio devices, and/or gyros.

The transmitting device 110 includes at least one proximity sensor 125 positioned at a surface of the physical housing structure of the transmitting device 110 adjacent to one or more antennas contained within the physical housing structure. As mentioned above with reference to FIG. 1A, the at least one proximity sensor 125 may be configured to determine an approximate distance from the at least one proximity sensor 125 to external objects. In some examples, the at least one proximity sensor 125 may be arranged in a known geometry relative to one or more antennas of the transmitting device 110, such that measurements taken by the at least one proximity sensor 125 may be informative as to the distance from one or more antennas to one or more external objects.

The user device 105 and the transmitting device 110 may be operatively and/or communicatively coupled by way of connection 115 (e.g., wired lead connection, wireless connection, etc.). For example, the transmitting device 110 may be operably or at least communicatively tethered to the user device 105 via one or more wires or optical fibers in a cable with appropriate connectors, and may communicate according to any of a variety of tethered protocols, such as USB®, USB2®, USB3®, Ethernet®, Thunderbolt®, and Lightning® protocols. Alternatively or additionally, the transmitting device 110 may be wirelessly communicatively coupled to the user device 105. For example, the transmitting device 110 and the user device 105 may each include a transmitter, receiver or transceiver (collectively radio) and associated antenna to establish wireless communication there between according to any of the variety of wireless communications protocols described above with reference to the communications conducted by the portable device component B 110 using the transmit antenna(s) 120. In some embodiments, the portable device component B 110 may leverage one or more of components 120, 150, 155, 160, and 165 to communicate with the portable device component A 105.

Beyond being operatively and/or communicatively coupled in this manner, the user device 105 and the transmitting device 110 can be seen as being physically separate and/or displaced components of the augmented reality system 100B. As such, the user device 105 and the transmitting device 110 may be positioned in different locations. For example, the user device 105 may be worn on the head of user, while the transmitting device 110 may be removably attached to the hip of the user in a belt-coupling style configuration. In other examples, the transmitting device 110 may be removably attached to another portion of the body of the user, removably attached to or located within a garment or other accessory worn by the user, or positioned in another location within the environment of the user.

Figure 2:
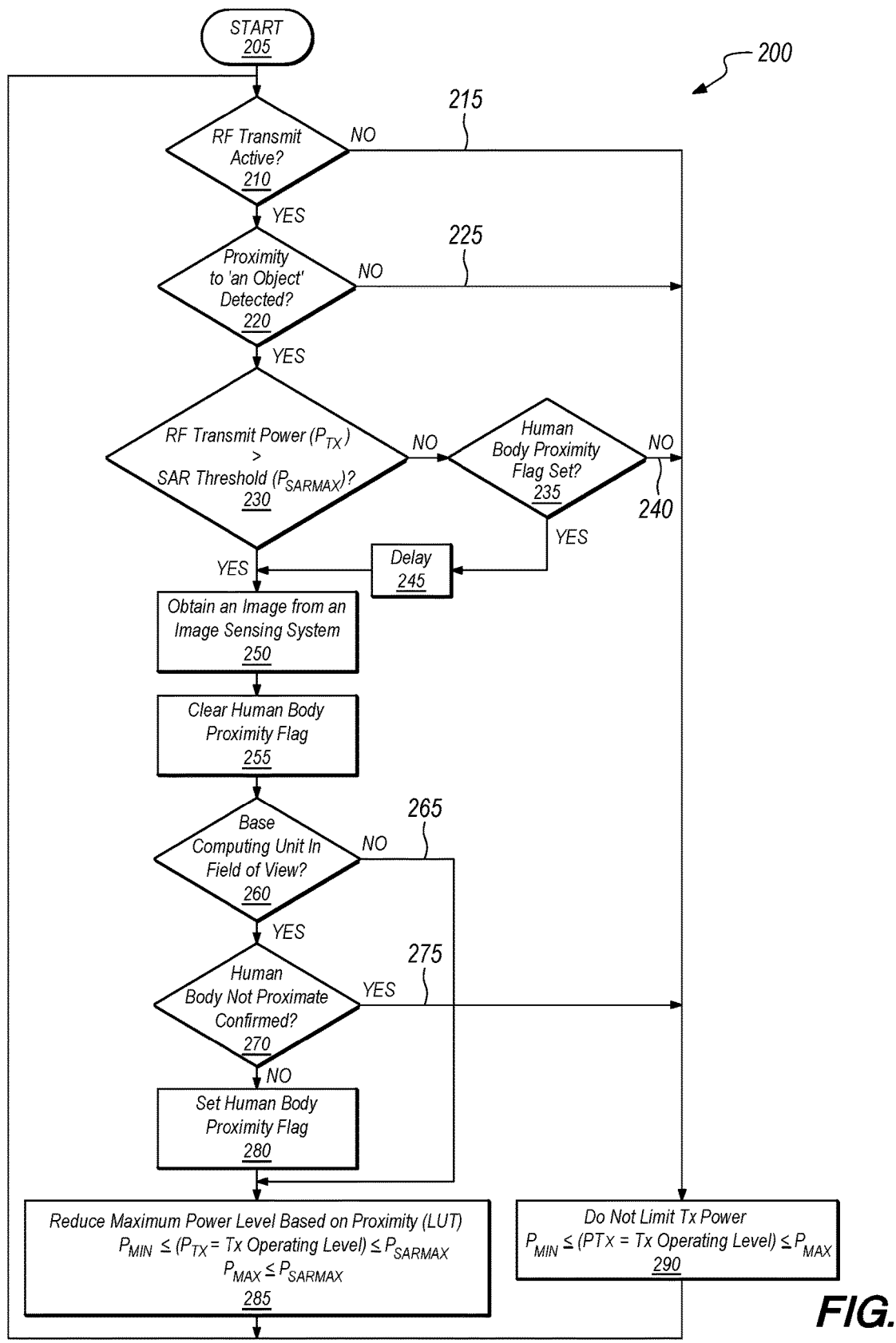
FIG. 2 is a diagram showing a flow chart for the disclosed method for determining the proximity of transmitter antennas of portable devices to a human body for limiting transmitter output power ($P_{TX}$) to meet SAR requirements, in accordance with at least one embodiment of the present disclosure.

FIG. 2 is a diagram showing a flow chart for the disclosed method 200 for determining the proximity of transmitter antennas of portable devices to a human body for limiting transmitter output power ($P_{TX}$) to meet SAR requirements, in accordance with at least one embodiment of the present disclosure. One or more of the operations of method 200 described below may, for instance, be performed by processor 130 and/or baseband processor 150 of the portable device component B 110, as described above with reference to FIGS. 1A and 1B. In some examples, one or more of the operations of method 200 described below may be performed by one or more other computing devices communicatively coupled to the portable device component B 110 of FIGS. 1A and 1B.

At the start (205) of the method 200, is it determined whether an RF transmit antenna of a transmitting device is active (i.e., transmitting) (210). If it is determined that the RF transmit antenna is not active (215), then the $P_{TX}$ is not adjusted (i.e., the transmitter output power is not limited) (290). Then, the method proceeds back to the start (205).

However, if it is determined that the RF transmit antenna is active, then a proximity sensor, and in some embodiments a secondary sensor, communicatively coupled to the transmitting device senses whether an object is proximate to the transmitting device (220). If the proximity sensor, and in some embodiments the secondary sensor, determines that an object is not proximate to the transmitting device, then the $P_{TX}$ is not adjusted (i.e., the transmitter output power is not limited) (225). Then, the method proceeds back to the start (205).

However, if the proximity sensor determines that an object is proximate to the transmitting device, then it is determined whether the $P_{TX}$ is greater than a SAR threshold output power ($P_{SARMAX}$) (230). The SAR threshold output power ($P_{SARMAX}$) may be determined at this juncture by accessing a look-up table, such as SAR LUT 160 as described above with reference to FIG. 1A. If it is determined that the $P_{TX}$ is not greater than $P_{SARMAX}$, then it is determined whether a human body proximity flag has been set (235). If it is determined that a human body proximity flag has not been set (240), then the $P_{TX}$ is not adjusted (i.e., the transmitter output power is not limited) (290). Then, the method proceeds back to the start (205).

However, if is determined that a human body proximity flag has been set (i.e., the $P_{TX}$ was determined to be greater than $P_{SARMAX}$ in a previous iteration of method 200), then performance of the method 200 is delayed by a predetermined amount of time (245). The purpose of the delay of time is to ensure that the device's processing system is not burdened with frequent requests for image recognition in cases when the human body proximity flag is set (i.e., a human body has been detected and the transmitter output power is limited to $P_{SARMAX}$). After the human body proximity flag is set, during any subsequent polling in which proximity to "an object" is detected, the request to the image sensing system is delayed to save processing power. Since the transmitter output power is limited to be less than or equal to $P_{SARMAX}$, there is no risk of exceeding the SAR exposure limit in this scenario. Instead, the removal of the limit on the transmitter output power to be less than or equal to $P_{SARMAX}$ is delayed in case the proximate object is not a human body.

The amount of delay of time to be added can be decided based on a number of factors including, but not limited to, signal conditions (fluctuations in signal quality), static or mobile user (whether the RF transmitter is in motion or is stationary), battery life (whether we need to preserve the battery when it is running low), and processor task priority (whether other high priority tasks are running). The delay of time can vary from a milliseconds range in highly dynamic signal condition environments, to a few seconds, or tens of seconds in other scenarios. The delay period may be predetermined, or may be adaptively determined in real-time depending on whether a potential SAR compliance issue has been detected and/or the severity of the issue. One of skill in the art will appreciate many variations of the listed delays.

After performance of the method 200 is delayed by a predetermined amount of time, an image is obtained from an image sensing system (e.g., a camera) (250). After obtaining the image, the human proximity flag is cleared (255). Then, the image is analyzed to determine whether the transmitting device is within a field of view (FOV) of the image sensing system (260). If it is determined that the transmitting device is not within a FOV of the image sensing system (e.g., the transmitting device is not recognized as being shown in the image), then the $P_{TX}$ of the antenna is adjusted to be less than or equal to $P_{SARMAX}$ (265, 285). In doing so, the method 200 errs on the side of protection regarding SAR exposure to a human. Then, the method proceeds back to the start (205).

However, if the transmitting device is detected within a FOV of the image sensing system (e.g., the transmitting device is identified as being shown in the image by way of one or more image recognition techniques), then the image is analyzed to determine whether it can be confirmed that the transmitting device is not proximate to a human body (270). If it is confirmed that the transmitting device is not proximate to a human body (275), then the $P_{TX}$ is not adjusted (i.e., the transmitter output power is not limited) (290). Then, the method proceeds back to the start (205). Requiring confirmation that the transmitting device is not proximate to a human body before operating with an unadjusted $P_{TX}$ maximizes safety by avoiding exposure of human bodies to RF energy.

However, if it cannot be confirmed that the transmitting device is not proximate to a human body, then the human body proximity flag is set (280). After the human body proximity flag is set, the $P_{TX}$ of the antenna is adjusted to be less than or equal to $P_{SARMAX}$ (285). Then, the method proceeds back to the start (205).

Figure 5:
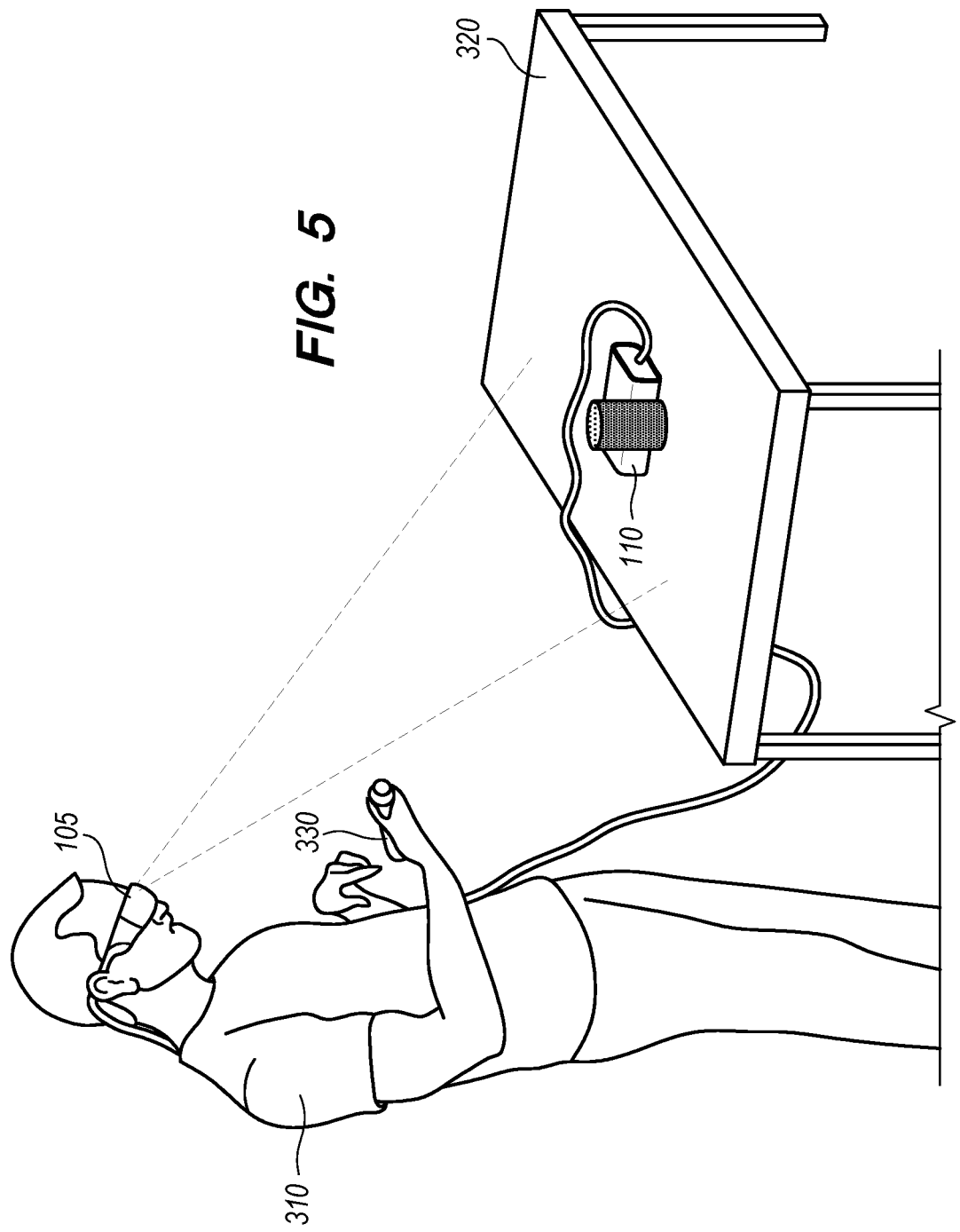
FIG. 5 is a diagram showing the disclosed system for determining the proximity of transmitter antennas of portable devices to a human body for limiting transmitter output power ($P_{TX}$) to meet SAR requirements, where the portable device is not located on a human body, in accordance with at least one embodiment of the present disclosure.
Figure 6:
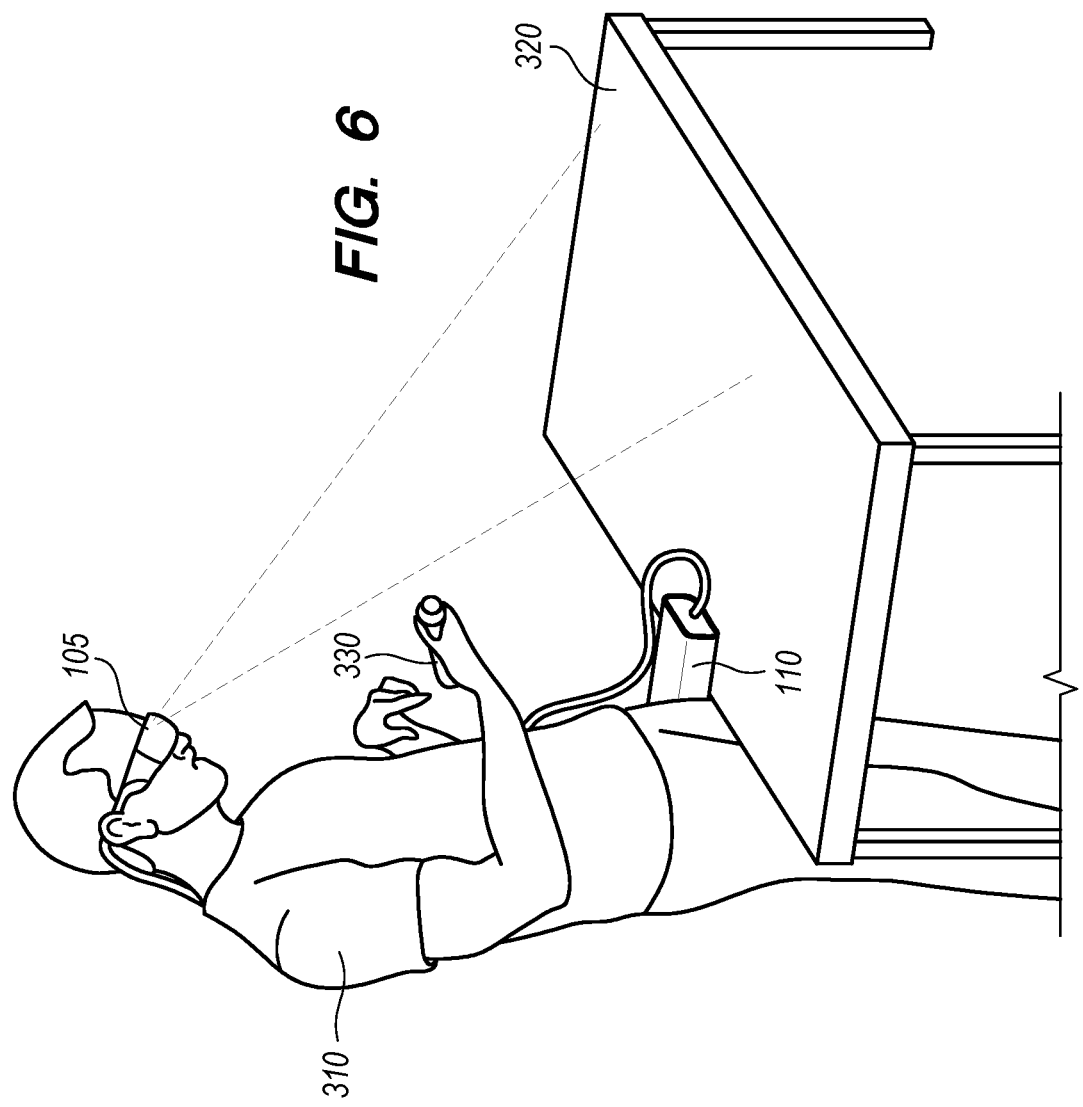
FIG. 6 is a diagram showing the disclosed system for determining the proximity of transmitter antennas of portable devices to a human body for limiting transmitter output power ($P_{TX}$) to meet SAR requirements, where the portable device is located adjacent a human body, in accordance with at least one embodiment of the present disclosure.

In another embodiment, the system can provide user feedback (e.g., through a headset 105, as shown in FIG. 1B) to request the user to reposition themselves relative to the transmitting device 110 (see e.g., FIG. 1B) to allow the system to operate at higher $P_{TX}$. The user feedback may be in the form of a visual or audio notification, prompt, etc. suggesting that the user reposition themselves (e.g., "Please move away from the transmitting device to improve signal quality.") In another example, haptic/tactile feedback may be provided by way of a peripheral device (e.g., a totem 330 as shown in FIGS. 5 and 6). In yet another example, one or more user interface components (e.g., speaker, LEDs, etc.) housed within the transmitting device 110 may be activated. Such an embodiment may be particularly useful in situations where the system is operating with a particularly weak WI-FI® or cellular connection, but the transmitting device 110 is positioned too close to the user's body for the system to be able to operate at the necessary transmit powers to maintain adequate communication.

It should be appreciated that the specific steps illustrated in FIG. 2 provide a particular method for determining the proximity of transmitter antennas of portable devices to a human body for limiting transmitter output power ($P_{TX}$) to meet SAR requirements. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. Examples of such steps may include one or more operations and/or sub-operations described above as being executable by one or more system components described above with reference to FIGS. 1A and 1B. One of ordinary skill in the art would recognize many variations, modifications, and alternatives.

For example, in some implementations, method 200 may be seen as representing a process of (i) obtaining output data from at least one sensor of a transmitting device (see e.g., operations of method 200 at 220), (ii) determining whether the sensor data indicates that the transmitting device is positioned relative to one or more objects located in the environment of the transmitting device in a manner such that, under current operating parameters of at least one antenna of the transmitting device, (iii) the one or more objects are subject to being exposed to levels of RF energy that exceed one or more thresholds (see e.g., operations of method 200 at 220, 225, and/or 230), (iv) obtaining one or more images from at least one camera in response to determining that the sensor data indicates that the one or more objects are subject to being exposed to levels of RF energy that exceed one or more thresholds (see e.g., operations of method 200 at 250), (v) processing the one or more images to determine whether the one or more images serve to confirm that none of the one or more objects are biologically human (see e.g., operations of method 200 at 260, 265, 270, and/or 275), (vi) determining a maximum level of power at which the at least one antenna is to transmit RF signals based on the processing (see e.g., operations of method 200 at 285 or 290), and (vii) controlling the at least one antenna to transmit RF signals at levels of power less than or equal to the determined maximum level of power (see e.g., operations of method 200 at 285 or 290). In some embodiments, such operations may be executed in a computing system. The computing system may include a physical housing structure and multiple electronic hardware components, at least a portion of which are contained within or attached to the physical housing structure. For example, the multiple hardware components may include at least one RF antenna, at least one sensor configured to monitor one or more conditions of the at least one antenna relative to an environment of the physical housing structure, at least one camera, and at least one processor. The at least one processor may, for instance, be communicatively coupled to the at least one antenna, the at least one sensor, and the at least one camera. As such, in some examples, the at least one processor may execute some or all of operations (i) through (vii) described above.

Figure 3:
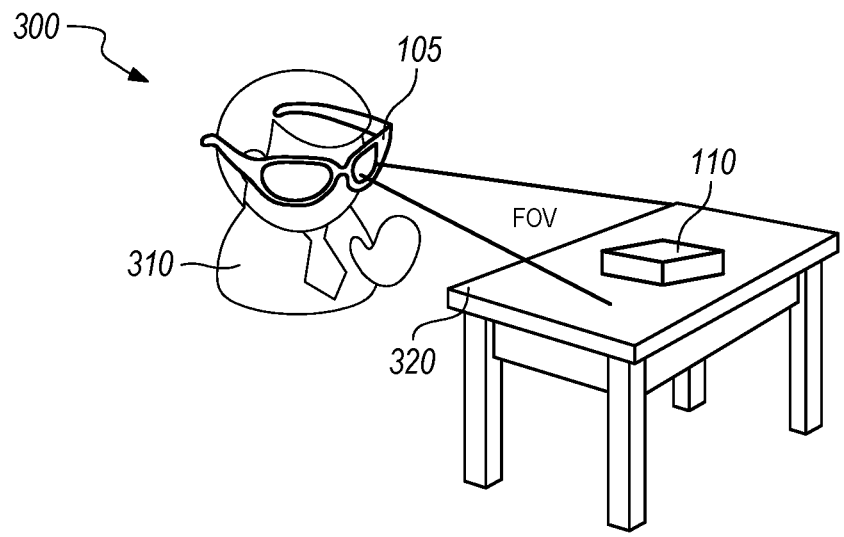
FIG. 3 is a diagram showing the disclosed system for determining the proximity of transmitter antennas of portable devices to a human body for limiting transmitter output power ($P_{TX}$) to meet SAR requirements, where the portable device is not located on a human body, in accordance with at least one embodiment of the present disclosure.

FIG. 3 is a diagram 300 showing the disclosed system for determining the proximity of transmitter antennas of portable devices to a human body for limiting transmitter output power ($P_{TX}$) to meet SAR requirements, where the portable device (e.g., a transmitting device) 110 is not located on a human body, in accordance with at least one embodiment of the present disclosure. In this figure, a user 310 is shown to be wearing a portable device component A (e.g., a user device) 105, which is in the form of a head-mounted display device; and a portable device component B (e.g., a transmitting device) 110 is shown to be on a table 320.

In the example of this figure, the portable device component B (e.g., a transmitting device) 110 determines that the portable device component B (e.g., a transmitting device) 110 is within a field of view (FOV) of the portable device component A (e.g., a user device) 105. Then, the portable device component B (e.g., a transmitting device) 110 determines that the portable device component B (e.g., a transmitting device) 110 is not proximate to a human body (i.e., the portable device component B (e.g., a transmitting device) 110 is proximate a table 320 instead). As such, the portable device component B (e.g., a transmitting device) 110 will not adjust the $P_{TX}$ (i.e., the transmitter output power will not be limited).

Figure 4:
FIG. 4 is a diagram showing the disclosed system for determining the proximity of transmitter antennas of portable devices to a human body for limiting transmitter output power ($P_{TX}$) to meet SAR requirements, where the portable device is located on a human body, in accordance with at least one embodiment of the present disclosure.

FIG. 4 is a diagram 400 showing the disclosed system for determining the proximity of transmitter antennas of portable devices to a human body for limiting transmitter output power ($P_{TX}$) to meet SAR requirements, where the portable device (e.g., a transmitting device) 110) is located on a human body, in accordance with at least one embodiment of the present disclosure. In this figure, a user 310 is shown to be wearing a portable device component A (e.g., a user device) 105, which is in the form of a head-mounted display device; and a portable device component B (e.g., a transmitting device) 110 is shown to be on the user's 310 lap.

In the example of this figure, the portable device component B (e.g., a transmitting device) 110 determines that the portable device component B (e.g., a transmitting device) 110 is within a field of view (FOV) of the portable device component A (e.g., a user device) 105. Then, the portable device component B (e.g., a transmitting device) 110 determines that the portable device component B (e.g., a transmitting device) 110 is proximate to a human body (i.e., the portable device component B (e.g., a transmitting device) 110 is proximate the user 310). As such, the portable device component B (e.g., a transmitting device) 110 will adjust the $P_{TX}$ to be less than or equal to $P_{SARMAX}$.

FIG. 5 depicts the disclosed system for determining the proximity of transmitter antennas of portable devices to a human body for limiting transmitter output power ($P_{TX}$) to meet SAR requirements, where the portable device (e.g., a transmitting device) 110 is not located on a human body, in accordance with at least one embodiment of the present disclosure. In this figure, a user 310 is shown to be wearing a portable device component A (e.g., a user device) 105, which is in the form of a head-mounted display device (e.g., headset); and a portable device component B (e.g., a transmitting device) 110 is shown to be on a table 320.

In the example of this figure, the portable device component B (e.g., a transmitting device) 110 determines that the portable device component B (e.g., a transmitting device) 110 is within a field of view (FOV) of the portable device component A (e.g., a user device) 105. Then, the portable device component B (e.g., a transmitting device) 110 determines that the portable device component B (e.g., a transmitting device) 110 is not proximate to a human body. The portable device component B (e.g., a transmitting device) 110 determines that the portable device component B (e.g., a transmitting device) 110 is instead proximate to a soda can (i.e., not a human body). Having confirmed that the portable device component B (e.g., a transmitting device) 110 is not proximate a human body, the portable device component B (e.g., a transmitting device) 110 will not adjust the $P_{TX}$ (i.e., the transmitter output power will not be limited) (see e.g., 270 and 275 in FIG. 2). In some embodiments, the imaging sensor used to acquire an image for recognizing objects proximate the portable device component B (e.g., a transmitting device) 110 may be part of a totem controller 330 in the system.

FIG. 6 depicts the disclosed system for determining the proximity of transmitter antennas of portable devices to a human body for limiting transmitter output power ($P_{TX}$) to meet SAR requirements, where the portable device (e.g., a transmitting device) 110 is located adjacent a human body, in accordance with at least one embodiment of the present disclosure. In this figure, a user 310 is shown to be wearing a portable device component A (e.g., a user device) 105, which is in the form of a head-mounted display device (e.g., headset); and a portable device component B (e.g., a transmitting device) 110 is shown to be on a table 320.

In the example of this figure, the portable device component B (e.g., a transmitting device) 110 determines that the portable device component B (e.g., a transmitting device) 110 is proximate an object. However, the portable device component B (e.g., a transmitting device) 110 is unable to identify the portable device component B (e.g., a transmitting device) 110 in one or more images captured by an imaging sensor of user device 105. Consequently, the $P_{TX}$ is adjusted to be less than $P_{SARMAX}$ (see e.g., 270, 280, and 285 in FIG. 2). In this particular embodiment, the portable device component B (e.g., a transmitting device) 110 is adjacent the user 310, and reducing $P_{TX}$ protected the user from exposure to RF energy.

Although primarily described within the context of augmented reality, mixed reality, and virtual reality systems, it is to be understood that the systems and techniques described herein may be applied in systems that are leveraged in other settings, involve other types of devices, execute other types of operations, or a combination thereof. For example, the techniques described herein may be applied in systems and scenarios involving smartphones, smart vehicles, tablets, laptops, smartwatches, smart garments/textiles and other wearable devices, dongles, desktop computers, appliances, and the like. In some embodiments, one or more of the systems and techniques described herein may be applied in a particular computing system to detect, identify, and/or address potential SAR compliance issues that arise in one or more devices that are external to the particular computing system. For instance, one or more of the systems and techniques described herein may be applied in a mobile computing device so as to enable the mobile computing device to facilitate the detection, identification, and/or remediation of potential SAR compliance issues that may arise in a nearby smart appliance equipped with wireless communication capabilities.

Figure 7:
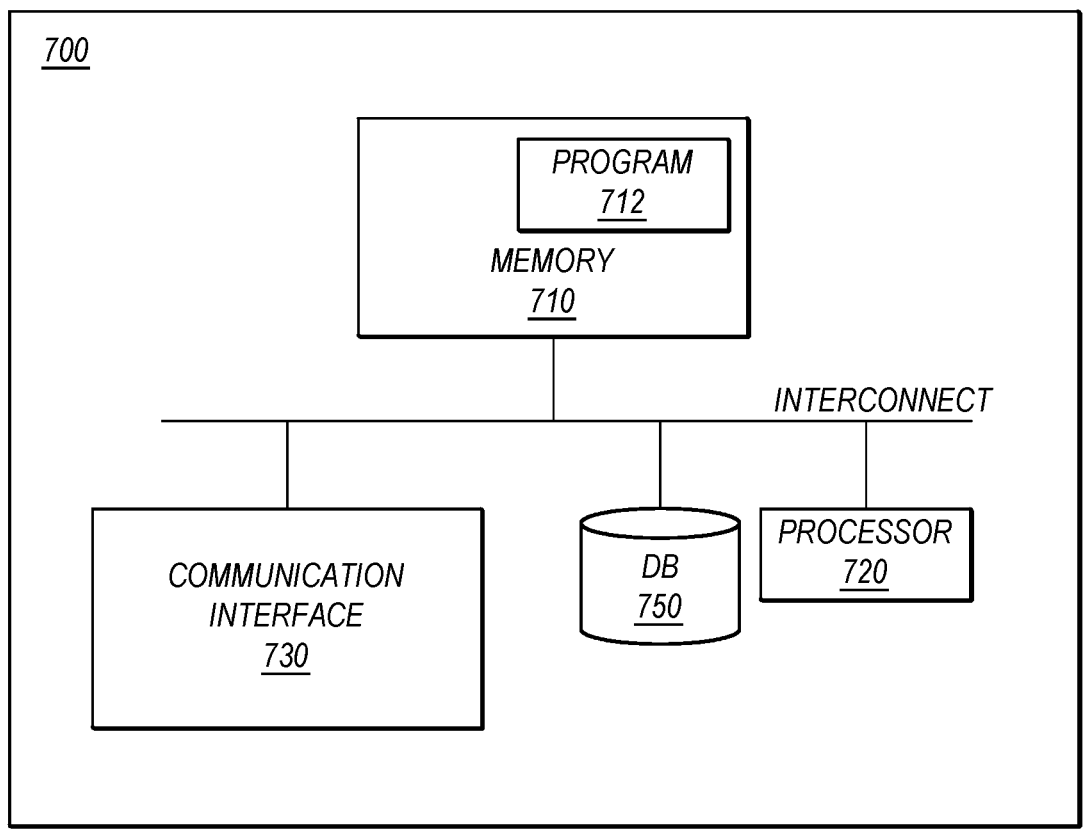
FIG. 7 is a block diagram of components of a computing apparatus or system in which various embodiments may be implemented or that may be utilized to execute embodiments.

FIG. 7 is a block diagram 700 of components of a computing apparatus or system in which various embodiments may be implemented or that may be utilized to execute embodiments. FIG. 7 generally illustrates components of a computing device 700 (e.g., the portable device component A (e.g., a user device) 105 and/or the portable device component B (e.g., a transmitting device) 110 of FIG. 1A or 1B) that may be utilized to execute embodiments and that includes a memory 710, a program (e.g., an image processing program, a proximity sensor processing program, and/or a transmitter output power adjustment program) 712, a processor or controller (e.g., processing componentry of the portable device component A 105, the processor 130, and/or the baseband processor 150 of FIG. 1A) 720 to execute the program 712, a database 750 for storing data (e.g., an image(s), proximity sensor data, and/or the transmit power reduction for SAR LUT 160 of FIG. 1A) a network interface 730 (e.g., the baseband processor 150, RF transmit controller 155, RF power amplifier 165, transmit antenna(s) 120 of FIG. 1A, and/or other hardware for communications with a network or interconnect 740 between such components). The memory 710 may be or include one or more of cache, RAM, ROM, SRAM, DRAM, RDRAM, EEPROM and other types of volatile or non-volatile memory capable of storing data. The processor unit 720 may be or include multiple processors, a single threaded processor, a multi-threaded processor, a multi-core processor, or other type of processor capable of processing data. Depending on the particular system component (e.g., whether the component is a computer or a hand-held mobile communications device), the interconnect 740 may include a system bus, LDT, PCI, ISA, or other types of buses, and the communications or network interface may, for example, be an Ethernet interface, a Frame Relay interface, or other interface. The network interface 730 may be configured to enable a system component to communicate with other system components across a network that may be a wireless or various other networks, such as one or more of those described above with reference to FIGS. 1A and 1B. It should be noted that one or more components of computing device 700 may be located remotely and accessed via a network. Accordingly, the system configuration provided in FIG. 7 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 720 executes program instructions 712 within memory 710 and/or embodied on the carrier to implement method embodiments. Further, embodiments may reside and/or execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

As a further example, embodiments may involve an image processing program or algorithm, a proximity sensor processing program or algorithm, and/or a transmitter output power adjustment program or algorithm that may each be a standalone application, which may contain one or more programs, or that is a part of another system or program.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

What is claimed is:

1. A method, comprising:
    determining whether a transmitting power of a transmitting device is to be adjusted based at least in part upon a state of an antenna of the transmitting device at least by:
        receiving image data from an image capturing system physically separate from the transmitting device; and
        determining whether the transmitting device is proximate to a human body or a portion thereof by performing one or more analyses on the image data captured by the image capturing system; and
    determining whether the transmitting power of the transmitting device is to be adjusted based at least in part upon a result of determining whether the transmitting device is proximate to the human body or the portion thereof.

2. The method of claim 1, wherein the image capturing system is communicably coupled to the transmitting device via a wired or wireless connection, and a portable augmented reality display device comprises both the image capturing system and the transmitting device.

3. The method of claim 1, wherein determining whether the transmitting power of the transmitting device comprises:
    determining whether the state of the antenna of the transmitting device is in an active state or an inactive state; and
    identifying a threshold level for the transmitting power of the transmitting device.

4. The method of claim 3, further comprising:
    lowering the transmitting power of the transmitting device to or below the threshold level for the transmitting power when it is determined that the transmitting device is proximate to the human body or the portion thereof, and that the state of the antenna of the transmitting device is in the active state.

5. The method of claim 3, wherein determining whether the transmitting power of the transmitting device comprises:
    lowering the transmitting power of the transmitting device to or below the threshold level for the transmitting power when it cannot be determined that the transmitting device is proximate to the human body or the portion thereof, and that the state of the antenna of the transmitting device is in the active state.

6. The method of claim 3, wherein determining whether the transmitting power of the transmitting device comprises:
    increasing the transmitting power of the transmitting device above the threshold level for the transmitting power when it is determined that the transmitting device is not proximate to the human body or the portion thereof, and that state of the antenna of the transmitting device is in the active state.

7. The method of claim 3, further comprising:
    delaying receipt of the image data from the image capturing system for a predetermined period of time when it is determined that that the state of the antenna of the transmitting device is in in the inactive state.

8. The method of claim 3, further comprising:
    delaying, for a predetermined period of time, receipt of the image data from the image capturing system and performance of the one or more analyses when it is determined that that the state of the antenna of the transmitting device is in in the inactive state; and
    resuming the receipt of the image data from the image capturing system and the performance of the one or more analyses after the period of time has lapsed.

9. The method of claim 8, wherein the amount of time is determined based at least in part upon at least one of a signal condition of the transmitting device, a state of motion of the transmitting device, a power status of the transmitting device, or a tasking priority of a processor of the transmitting device.

10. The method of claim 3, wherein determining whether the transmitting device is proximate to the human body or the portion thereof comprises:
    determining whether the transmitting device is within a field of view of the image capturing system;
    recognizing one or more objects in the image data based at least in part upon the one or more analyses; and
    determining whether the one or more objects recognized in the image data correspond to the human body or the portion thereof.

11. The method of claim 1, performing the one or more analyses on the image data comprising:
    determining whether the image data comprises an image of at least a portion of the antenna of the transmitting device, wherein the image capturing system is a part of the transmitting device and is arranged within the transmitting device so that the at least the portion of the antenna is within a field of view of the image capturing system.

12. The method of claim 1, determining whether the transmitting device is proximate to the human body or the portion thereof comprising:
    receiving proximity sensor data from a proximity sensor in the transmitting device;
    determining whether the transmitting device is located less than a threshold distance from one or more objects; and invoking the one or more analyses on the image data when it is determined that the transmitting device is located less than a threshold distance from one or more objects.

13. A system, comprising:
a transmitting device configured to determine whether a transmitting power of the transmitting device is to be adjusted based at least in part upon a state of an antenna of the transmitting device at least by further configure the transmitting device to perform a set of acts that comprises:
  receiving image data from an image capturing system physically separate from the transmitting device; and
  determining whether the transmitting device is proximate to a human body or a portion thereof by performing one or more analyses on the image data captured by the image capturing system; and
  determining, at the transmitting device, whether the transmitting power of the transmitting device is to be adjusted based at least in part upon a result of determining whether the transmitting device is proximate to the human body or the portion thereof.

14. The system of claim 13, further comprising a portable augmented reality display device that comprises both the image capturing system and the transmitting device, wherein the image capturing system is communicably coupled to the transmitting device via a wired or wireless connection.

15. The system of claim 13, wherein the transmitting device configured to determine whether the transmitting power of the transmitting device is further configured to:
  determine whether the state of the antenna of the transmitting device is in an active state or an inactive state; and
  identify a threshold level for the transmitting power of the transmitting device.

16. The system of claim 13, wherein the transmitting device configured to determine whether the transmitting power of the transmitting device is further configured to:
  lower the transmitting power of the transmitting device to or below the threshold level for the transmitting power when it is determined that the transmitting device is proximate to the human body or the portion thereof, and that the state of the antenna of the transmitting device is in the active state;
  lower the transmitting power of the transmitting device to or below the threshold level for the transmitting power when it cannot be determined that the transmitting device is proximate to the human body or the portion thereof, and that the state of the antenna of the transmitting device is in the active state; and
  increase the transmitting power of the transmitting device above the threshold level for the transmitting power when it is determined that the transmitting device is not proximate to the human body or the portion thereof, and that state of the antenna of the transmitting device is in the active state.

17. The system of claim 13, wherein the transmitting device configured to determine whether the transmitting power of the transmitting device is further configured to:
  delaying receipt of the image data from the image capturing system for a predetermined period of time when it is determined that that the state of the antenna of the transmitting device is in in the inactive state;
  delaying, for a predetermined period of time, receipt of the image data from the image capturing system and performance of the one or more analyses when it is determined that that the state of the antenna of the transmitting device is in in the inactive state; and
  resuming the receipt of the image data from the image capturing system and the performance of the one or more analyses after the period of time has lapsed.

18. A transmitting device, comprising:
an antenna configured to transmit signals at a transmitting power, wherein the transmitting power is adjustable;
a processor operatively coupled to the antenna;
a memory storing thereupon a set of instructions which, when executed by the processor, causes the processor at least to:
  determine whether to adjust the transmitting power based at least in part upon a state of the antenna at least by performing, by the processor, a set of acts that comprises:
    receiving image data from an image capturing system physically separate from the transmitting device; and
    determining whether the transmitting device is proximate to a human body or a portion thereof by performing one or more analyses on the image data captured by the image capturing system; and
  determine whether the transmitting power is to be adjusted based at least in part upon a result of determining whether the transmitting device is proximate to the human body or the portion thereof.

19. The transmitting device of claim 18, further comprising a radio-frequency power amplifier, a proximity sensor, and an image processing subsystem, wherein the image capturing system is a portable augmented reality display device, the image processing subsystem is configured to receive the image data from the image capturing system and to recognize one or more objects from the image data at least by performing the one or more analyses.

20. The transmitting device of claim 18, further comprising additional instructions which, when executed by the processor, cause the processor at least to:
  lower the transmitting power of the transmitting device to or below a threshold level for the transmitting power when it is determined that the transmitting device is proximate to the human body or the portion thereof, and that a state of the antenna of the transmitting device is in an active state;
  lower the transmitting power of the transmitting device to or below the threshold level for the transmitting power when it cannot be determined that the transmitting device is proximate to the human body or the portion thereof, and that the state of the antenna of the transmitting device is in the active state;
  increase the transmitting power of the transmitting device above the threshold level for the transmitting power when it is determined that the transmitting device is not proximate to the human body or the portion thereof, and that state of the antenna of the transmitting device is in the active state; and
  delay, for a predetermined period of time, receipt of the image data from the image capturing system and performance of the one or more analyses when it is determined that that the state of the antenna of the transmitting device is in an inactive state, wherein delaying the receipt of the image data further comprises resuming the receipt of the image data from the image capturing system and the performance of the one or more analyses after the period of time has lapsed.

* * * * *